United States Patent Office 2,757,207
Patented July 31, 1956

2,757,207

α,α-DIMETHYLNAPHTHYLMETHYL HYDRO-
PEROXIDES

Eugene J. Lorand, Wilmington, Del., and John E. Reese,
St. Simons Island, Ga., assignors to Hercules Powder
Company, Wilmington, Del., a corporation of Delaware No Drawing. Application March 20, 1951,
Serial No. 216,663

The portion of the term of the patent subsequent to
December 29, 1970 has been disclaimed 3 Claims. (Cl. 260—610)

This invention relates to organic hydroperoxides and more particularly to a novel group of organic hydroperoxides designated as α,α-dimethylnaphthylmethyl hydroperoxides.

Numerous hydroperoxides have hitherto been known to the art, and perhaps the most widely known class has been that of the alkyl hydroperoxides. A representative member of this class is t-butyl hydroperoxide. Certain cyclic hydroperoxides also have been known for some time, and these may be illustrated by those hydroperoxides obtainable through autoxidation of tetralin, decalin and isopropylbenzene. Even though these hydroperoxides have found considerable utility in various fields, for example, as catalysts in the polymerization of vinyl, vinylidene and vinylene compounds, nevertheless there has remained a demand for new hydroperoxides having enhanced physical and chemical properties.

Now in accordance with this invention, it has been found that α,α-dimethylnaphthylmethyl hydroperoxides may be prepared by passing an oxygen-containing gas through an isopropylnaphthalene in the liquid phase at elevated temperatures, and that the hydroperoxides so produced have very desirable physical and chemical characteristics.

Illustrative of the invention is the oxidation of 2-isopropylnaphthalene (β-isopropylnaphthalene) to α,α-dimethyl-2-naphthylmethyl hydroperoxide. The hydrocarbon and an aqueous solution of an alkali, for example, are agitated vigorously while a stream of air or oxygen is simultaneously blown through the reaction mixture. The reaction is carried out at a temperature, for example, of about 90° C. until standard analytical data indicate sufficient conversion of the hydrocarbon and yield of the hydroperoxide. The reaction mixture then is worked up to recover the hydroperoxide. The oxidation of 1-isopropylnaphthalene (α-isopropylnaphthalene) may be similarly carried out to produce α,α-dimethyl-1-naphthylmethyl hydroperoxide.

The following examples constitute specific illustrations of the products of this invention and processes which may be used for their preparation. All amounts are based on parts by weight.

Example I

Four hundred parts of commercial isopropylnaphthalene (refractive index at 20° C., 1.5858) in which 2 parts of manganese naphthenate of 6% manganese content had been dissolved was charged into a closed reaction vessel equipped with a reflux condenser, a gas inlet tube opening through a porous fritted-glass plate, a thermometer, and an efficient high-speed agitator. The reaction vessel was immersed in a constant temperature bath. While maintaining the reaction vessel at a temperature of 45° C., oxygen was passed through the reaction mixture at a rate of 10 liters per hour per kilogram of isopropylnaphthalene. No reaction having occurred at the end of 24 hours, the reaction was initiated by the addition of 8 parts of a reaction product obtained by the oxidation of cumene and containing 51.6% α,α-dimethylbenzyl hydroperoxide. The course of the reaction was followed by determining the refractive index and hydroperoxide content periodically. At the end of 48 hours the oxidized oils had a refractive index at 20° C. of 1.5900 and contained 17.3% hydroperoxide. At the end of 72 hours the refractive index was 1.5918 and the hydroperoxide content was 21.6%. Analysis of the reaction product indicated, in addition to the 21.6% α,α-dimethylnaphthylmethyl hydroperoxide, the presence of about 55% α,α-dimethylnaphthylmethyl alcohol.

Example II

A reaction vessel similar to that described in Example I was utilized, the only exception being that the gas inlet tube was a simple sparge tube. Into the reaction vessel were charged 495 parts of commercial isopropylnaphthalene (refractive index at 20° C., 1.5861), 250 parts of 2% aqueous sodium hydroxide and 5 parts of a t-butyl hydroperoxide product containing 81.5% hydroperoxide. Oxygen was passed through the reaction mixture at a rate of about 10 liters per hour per kilogram of isopropylnaphthalene and the temperature was maintained between 84° C. and 92° C. During most of the reaction the temperature was approximately 90° C. Samples were taken at periodic intervals for refractive index and hydroperoxide determinations, the hydroperoxide content of the oxidized oils being determined by adding a sample of the oil to acidified potassium iodide and noting the amount of iodine liberated. At the end of 24 hours the oxidized oils had a refractive index of 1.5900 and contained 27.3% hydroperoxide. At the end of 64 hours the refractive index was 1.5936 and the hydroperoxide content was 40.1%. The aqueous and organic layers were separated and the organic layer amounted to 510.2 parts.

Three hundred and eighty-eight parts of the organic layer was diluted with a small amount of benzene and the resulting solution was added slowly to 1552 parts of a 40% aqueous sodium hydroxide solution. Efficient agitation was utilized during the addition and additional benzene was added periodically to maintain fluidity of the reaction mixture. The temperature was maintained at about 10° C. After all the organic layer had been added, the reaction mixture was stirred for about 10 minutes and then filtered. The white solid alkali salt of the hydroperoxide was washed 4 times with 750 parts of heptane. The salt then was dispersed in about 1000 parts of water, cooled, and acidified to a pH of 8.4 with dilute sulfuric acid using good agitation. The white solid α,α-dimethylnaphthylmethyl hydroperoxide was filtered off, washed first with water and then with 0.5% sodium bicarbonate. It then was stirred with 1% sodium bicarbonate, filtered and dried. The amount of product was 129.1 parts, this constituting a recovery of 86.7%. Analysis by the iodine liberation method showed the product to be 100% hydroperoxide. It had a melting point of 66°–67° C.

Example III

β-isopropylnaphthalene was prepared by a sequence of reactions known to give the pure beta isomer. The pure compound boiled at 57° C./.07 mm.–61° C./.08 mm. and had a refractive index at 20° C. of 1.5869. Into an apparatus similar to that described in Example I was charged 20 parts of the pure β-isopropylnaphthalene and 0.2 part of calcium hydroxide. The reaction mixture was heated to a temperature of about 90° C. and oxygen was introduced at a rate of 300 liters per hour per kilogram of β-isopropylnaphthalene. After approximately 50 hours reaction time, the product was light yellow in color and had a refractive index at 20° C. of 1.5917. The reaction product contained 27.7% α,α-dimethyl-2-naphthylmethyl hydroperoxide.

Example IV

Following the general procedure of Example II, 200 parts isopropylnaphthalene was oxidized at 90° C. with oxygen in the presence of about 350 parts of 2% aqueous sodium carbonate solution. The isopropylnaphthalene contained 89.6% β-isopropylnaphthalene and 10.2% α-isopropylnaphthalene. The oxidation was initiated by the addition of 9 parts of an oxidation mixture containing 27% α,α-dimethylnaphthylmethyl hydroperoxide. At the end of 30 hours, the reaction product had a refractive index at 20° C. of 1.5918 and contained 29.9% hydroperoxide.

Example V

Following the procedure of Example IV, 89 parts of isopropylnaphthalene containing 63.1% β-isopropylnaphthalene and 39.1% α-isopropylnaphthalene was oxidized at 90° C. with oxygen in the presence of about 400 parts of 2% aqueous sodium carbonate. The reaction was initiated with 3 parts of the oxidate from the preceding example. At the end of 29 hours, the hydroperoxide content of the reaction mixture was 15.6% and the refractive index at 20° C. was 1.5918. The organic phase was separated from the aqueous phase while hot and was diluted with about 150 parts of hexane. The resulting solution was extracted with about 300 parts of 3% aqueous sodium hydroxide in 5 portions. The combined alkali extract was extracted once with hexane, separated from the hexane layer and cooled to about 0° C. while carbon dioxide was bubbled in to neutralize the sodium hydroxide. A white waxy solid separated and this was extracted with neohexane. The extract was dried and concentrated to obtain a white crystalline product having a melting point of 55°–57° C. Determination of hydroperoxide content by the iodine liberation method showed the presence of 96.3% α,α-dimethylnaphthylmethyl hydroperoxides.

Example VI

The procedure of Example IV was followed in oxidizing 216.4 parts of isopropylnaphthalene containing about 90% β-isopropylnaphthalene. The oxidation was initiated with 12.2 parts of an oxidation reaction mixture containing 17.8% α,α-dimethylnaphthylmethyl hydroperoxide and the reaction was carried out in the presence of about 250 parts of 2% sodium carbonate. The temperature was 90° C. In 27 hours the hydroperoxide content was 30.3% and the refractive index at 20° C. was 1.5912. The aqueous and oily layers were separated while hot and the latter amounted to 220.1 parts. This material was diluted with about 100 parts of heptane and the resulting solution then was added slowly to a well-stirred mixture of 310 parts sodium hydroxide in about 465 parts of water. The temperature during addition was maintained between 5° and 10° C. The precipitated salt was filtered and washed with heptane and amounted to 168 parts. It then was resuspended in about 250 parts heptane, stirred, and filtered twice, after which it amounted to 157 parts. It then was suspended in about 500 parts of cold water and, while the suspension was stirred, carbon dioxide was bubbled in for several hours. The liberated hydroperoxide was dissolved in about 1500 parts of petroleum ether and the resulting solution separated from the aqueous phase. The ether solution was washed, dried, and slightly concentrated, and, on standing, 33.4 parts of white needles separated. These had a melting point of 65°–67° C. Further concentration produced 23.4 parts additional material in 3 portions, the total amount recovered being 56.8 parts. The hydroperoxide material melting at 65°–67° C. was substantially pure α,α-dimethyl-2-naphthylmethyl hydroperoxide.

The compounds which are oxidized in accordance with this invention are those naphthalene hydrocarbons which contain an isopropyl substituent. The isopropyl group may be substituted in either the 1 (α) or 2 (β) positions in the naphthalene nucleus. As shown by the examples, it generally is more convenient to oxidize a mixture of isopropylnaphthalenes since this is the form of the product which is produced commercially. It is preferred, in using such a mixture, to oxidize one containing a preponderance of the 2-isopropylnaphthalene isomer. The rate of oxidation for this isomer is much higher than that for the corresponding 1-isopropylnaphthalene isomer. As shown by Example III, however, pure 2-isopropylnaphthalene per se may be oxidized and the same is true for the 1-isopropyl naphthalene isomer.

The hydroperoxides of this invention may be prepared by passing, with intimate contact, an oxygen-containing gas through an isopropylnaphthalene in the liquid phase at elevated temperatures. The liquid phase may be either substantially homogeneous, as when anhydrous conditions are used and the compound being oxidized is the principal component of the reaction mixture, or it may be heterogeneous, as when a separate aqueous phase which may be either ordinary water or an aqueous alkaline solution is included. The examples have set forth the use of molecular oxygen as the oxygen-containing gas, but air also may be used. The oxygen may be furnished also in mixtures of oxygen with nitrogen or other inert gases. The rate of input of the oxygen-containing gas may vary within a wide range depending on the concentration of the oxygen in the gas, the pressure at which the oxidation is carried out, and the efficiency of dispersion.

The oxidation may be carried out in a substantially homogeneous liquid phase under anhydrous conditions using low concentrations of a catalytically active heavy metal compound. Particularly useful are the compounds of metals such as manganese, copper, lead, iron, nickel, cobalt, vanadium, chromium and mercury. The oxides, hydroxides or organic acid salts of any of these metals or combinations thereof, which are soluble in the isopropylnaphthalene hydrocarbon or solution thereof in a suitable solvent, may be employed. In general, high hydroperoxide yields may be obtained if the concentration of the catalyst in solution in the oxidation reaction mixture is at any particular instant from about 0.15 to about 0.8% based on the isopropylnaphthalene hydrocarbon being oxidized.

The oxidation of the isopropylnaphthalene hydrocarbon also may be carried out in the presence of an aqueous phase. Either an aqueous alkali or ordinary water may be used as the aqueous medium. The ratio of the aqueous medium to the isopropylnaphthalene hydrocarbon being oxidized may vary within wide limits from about 1:10 to about 10:1, and when the aqueous medium is an aqueous alkali it may consist of a solution of an alkali metal hydroxide such as sodium, potassium, lithium, and the like, or of an alkaline earth metal hydroxide such as calcium or barium. Also operable are inorganic carbonates and bicarbonates such as sodium carbonate and sodium bicarbonate. The concentration of the alkaline solution may be from about 1% to about 35%.

When an aqueous phase is utilized, the oxidation may be carried out either in the presence or absence of a catalyst. The absence of a catalyst facilitates hydroperoxide production, but if a catalyst is used, a wide variety is available due to the fact that the reaction mixture contains both oily and aqueous phases. Both water-soluble and oil-soluble catalysts may be used and the amount may vary from about 0.2% to about 10% based on the hydrocarbon. The oxidized oils which are obtained through oxidation of the hydrocarbons of this invention and which contain preponderant amounts of hydroperoxides are useful in initiating the oxidation reaction by relieving inhibitions caused by harmful impurities. These oxidized oils, however, do not act as actual catalysts and are, therefore, highly desirable initiators for those oxidations which exhibit inhibition. These hydroperoxide-rich oils may be used in amounts varying from about 1% to about 50% of the isopropylnaphthalene hydrocarbon present.

The temperature at which the oxidation may be carried out may vary from about 20° C. to about 140° C. The pressures which can be utilized during oxidation are limited only by equipment design. From a practical standpoint, pressures from atmospheric up to about 500 p. s. i. are feasible. Since the reaction is heterogeneous, suitable agitation is necessary. It is particularly important to bring the air, oxygen, or other oxygen-containing gas into intimate contact with the liquid phase, and this may be effected by using high-speed stirrers, suitable nozzles, porous plates, or their combinations.

The hydroperoxide product may be recovered from the organic phase containing it by slowly adding the latter to a concentrated aqueous solution (25-40%) of sodium hydroxide, for example, to precipitate the sodium salt of the hydroperoxide. The precipitated salt then may be treated with dilute acid to liberate the hydroperoxide which can be further purified by crystallization. Another method for isolating the hydroperoxide is the extraction of the hydroperoxide from the organic phase with a dilute aqueous alkaline solution. The hydroperoxide is extracted in the form of its alkali metal salt, which is soluble in the dilute aqueous alkaline solution used, and the free hydroperoxide is precipitated in the aqueous solution by neutralization with carbon dioxide.

The products obtained according to this invention find various commercial applications. They are excellent catalysts for the polymerization of vinyl, vinylidene, and vinylene compounds, being, for example, highly useful in the copolymerization of butadiene with styrene or acrylonitrile to form synthetic rubber. They also are useful in rubber reclaiming, in flotation, and in kier boiling, bleaching, and other textile operations.

This application constitutes a continuation-in-part of our application for United States Letters Patent Serial No. 31,395, filed June 5, 1948, now U. S. Patent 2,664,448 issued December 29, 1953, and also our application for United States Letters Patent Serial No. 687,705, filed August 1, 1946, now U. S. Patent 2,548,435 issued April 10, 1951, which is in turn a continuation-in-part of our application for United States Letters Patent Serial No. 614,433, filed September 4, 1945, now abandoned.

What we claim and desire to protect by Letters Patent is:

1. As a new product, an $\alpha,\alpha$-dimethylnaphthylmethyl hydroperoxide.

2. As a new product, $\alpha,\alpha$-dimethyl-2-naphthylmethyl hydroperoxide.

3. As a new product, a mixture of $\alpha,\alpha$-dimethyl-1-naphthylmethyl hydroperoxide and $\alpha,\alpha$-dimethyl-2-naphthylmethyl hydroperoxide.

References Cited in the file of this patent

UNITED STATES PATENTS

| | | |
|---|---|---|
| 2,534,309 | Sheffield | Dec. 19, 1950 |
| 2,547,938 | Hall et al. | Apr. 10, 1951 |
| 2,548,435 | Lorand et al. | Apr. 10, 1951 |
| 2,628,983 | Aller et al. | Feb. 17, 1953 |
| 2,664,448 | Lorand et al. | Dec. 29, 1953 |

OTHER REFERENCES

Larsen et al.: Industrial and Eng. Chem., vol. 34 (February 1942), entire article pages 183–193 (page 191).